United States Patent
Chen et al.

(10) Patent No.: US 9,781,739 B2
(45) Date of Patent: Oct. 3, 2017

(54) METHOD, BASE STATION, TERMINAL AND SYSTEM FOR SYSTEM INFORMATION TRANSMISSION

(71) Applicant: ZTE Corporation, Shenzhen (CN)

(72) Inventors: Xianming Chen, Shenzhen (CN); Bo Dai, Shenzhen (CN); Zhaohua Lu, Shenzhen (CN)

(73) Assignee: XI'AN ZHONGXING NEW SOFTWARE CO.LTD., Xi'an (CN)

(*) Notice: Subject to any disclaimer, the term of this patent is extended or adjusted under 35 U.S.C. 154(b) by 0 days.

(21) Appl. No.: 15/114,525

(22) PCT Filed: Aug. 5, 2014

(86) PCT No.: PCT/CN2014/083733
§ 371 (c)(1),
(2) Date: Jul. 27, 2016

(87) PCT Pub. No.: WO2015/113391
PCT Pub. Date: Aug. 6, 2015

(65) Prior Publication Data
US 2016/0353473 A1 Dec. 1, 2016

(30) Foreign Application Priority Data
Jan. 28, 2014 (CN) .......................... 2014 1 0040904

(51) Int. Cl.
*H04W 4/00* (2009.01)
*H04W 72/12* (2009.01)
(Continued)

(52) U.S. Cl.
CPC .......... *H04W 72/1273* (2013.01); *H04L 1/08* (2013.01); *H04W 4/005* (2013.01); *H04W 48/10* (2013.01); *H04W 84/042* (2013.01)

(58) Field of Classification Search
CPC combination set(s) only.
See application file for complete search history.

(56) References Cited

U.S. PATENT DOCUMENTS 8,861,484 B2   10/2014  Du
2011/0002258 A1  1/2011  Du
(Continued)

FOREIGN PATENT DOCUMENTS

CN   101547075 A   9/2009
CN   102026372 A   4/2011

OTHER PUBLICATIONS

International Search Report in international application No. PCT/CN2014/083733, mailed on Nov. 18, 2014.
(Continued)

*Primary Examiner* — Frank Duong
(74) *Attorney, Agent, or Firm* — Oppedahl Patent Law Firm LLC

(57) ABSTRACT

A method for transmitting System Information (SI) includes that: a base station sequentially sends first to Xth SI according to scheduling periods and repeat times of the first to Xth SI in preset N pieces of SI (101), wherein N is a positive integer larger than 1, X is a positive integer larger than 1 and smaller than or equal to N, and the scheduling period and repeat times of the first SI are preset; and the base station notifies the scheduling periods and repeat times of the second to Xth SI through fields in the first SI (102). A base station, terminal and system for implementing the above-mentioned method are also provided.

21 Claims, 4 Drawing Sheets

(51) Int. Cl.
*H04L 1/08* (2006.01)
*H04W 84/04* (2009.01)
*H04W 48/10* (2009.01)

(56) References Cited

U.S. PATENT DOCUMENTS

| | | | | |
|---|---|---|---|---|
| 2015/0181575 A1* | 6/2015 | Ng | ........................ | H04L 5/0092 370/329 |
| 2015/0327155 A1* | 11/2015 | Lee | ....................... | H04W 48/12 370/329 |

OTHER PUBLICATIONS

English Translation of the Written Opinion of the International Search Authority in international application No. PCT/CN2014/083733, mailed on Nov. 18, 2014.

* cited by examiner

METHOD, BASE STATION, TERMINAL AND SYSTEM FOR SYSTEM INFORMATION TRANSMISSION

TECHNICAL FIELD

The present disclosure relates to an information transmission technology in the field of wireless communication, and in particular to a method, a base station, a terminal and a system for System Information (SI) transmission.

BACKGROUND

Machine Type Communication (MTC) is also called Machine To Machine (M2M) communication between User Equipment (UE) or terminals, and is a main application form of the present Internet of things. Low power consumption and low cost are important guarantees for its large-scale application. So far, an M2M technology has gained support from multiple international renowned manufacturers and approval of mobile service providers of each country. At present, M2M equipment deployed on the market is mainly based on a Global System of Mobile communication (GSM). In recent years, more and more mobile service providers select Long Term Evolution (LTE) as a direction of evolution of a broadband wireless communication system in the future because LTE has higher spectral efficiency. Various kinds of LTE-based M2M data services will be more attractive.

SI of an existing LTE system includes: a Master Information Block (MIB) and System Information Block 1 (SIB1) to SIB16, wherein the MIB includes a limited number of parameters which are most essential and are sent most frequently; and SIB1 includes information about whether a terminal is allowed to access a cell or not, scheduling information of other SI, and the like. In the existing LTE system, other SIBs (i.e. SIB2 to SIB16) except SIB1 are mapped to different SI messages, wherein one SI message may bear only one SIB or bear multiple different SIBs with the same sending period. In addition, SIB1 and all of the SI messages are transmitted on a Physical Downlink Shared Channel (PDSCH), and are dynamically scheduled according to a Physical Downlink Control Channel (PDCCH) which bears downlink allocation information. Here, a scheduling period of SIB1 is fixedly 80 ms, the same content is retransmitted every 20 ms in the period, and transmission of SIB1 is fixedly implemented through the sub-frame 5 of even radio frames; and first transmission is started from a radio frame of which System Frame Number (SFN) mod 8 is 0 (mod represents remainder calculation). All the SI messages are dynamically scheduled within periodic time windows, each SI message is associated with one SI time window, and the SI time windows of different SI messages are not overlapped; and in addition, sizes of the SI time windows of all the SI messages are the same, and may be flexibly configured through SIB1. In the determined time windows, the corresponding SI messages are allowed to be scheduled within any sub-frame (except a Multicast Broadcast Single Frequency Network (MBSFN) sub-frame, a Time Division Duplex (TDD) uplink sub-frame and the sending sub-frames of SIB1).

Some MTC terminals are installed in basements of houses or positions covered by aluminium alloy windows or conventional thick-walled building structures. Compared with normal LTE terminals, these terminals may have extraordinarily high penetration loss at radio frequency interfaces, so that it is needed to enhance coverage of the MTC terminals.

Here, a channel type to be enhanced includes: a Physical Uplink Shared Channel (PUSCH), a PDCCH, a Physical Uplink Control Channel (PUCCH) and the like. Coverage enhancement of a PDSCH includes coverage enhancement of broadcast SI and coverage enhancement of unicast data. In order to accumulate more energy to improve coverage, a repetition method is usually used for transmission enhancement of various types of channels.

If an SI transmission mechanism of the existing LTE system is applied to an MTC terminal in a coverage enhancement mode, the following problems may be caused: first, repetition of a PDCCH related to dynamic scheduling of SI may cause higher control overhead and longer time delay of access; and second, there are many types of SI at present and the transmission mechanism is complex, so that low cost and low complexity of the MTC terminal may not be achieved well.

SUMMARY

In order to solve the existing technical problems, the embodiments of the present disclosure provide a method, a base station, a terminal and a system for SI transmission.

An embodiment of the present disclosure provides a method for SI transmission, which may include that:

a base station sequentially sends first to Xth SI according to scheduling periods and repeat times of the first to Xth SI in preset N pieces of SI, wherein N may be a positive integer larger than 1, X may be a positive integer larger than 1 and smaller than or equal to N, and the scheduling period and repeat times of the first SI may be preset, wherein the base station may notify the scheduling periods and repeat times of the second to Xth SI through fields in the first SI.

An embodiment of the present disclosure further provides a method for transmitting SI, which may include that:

a terminal sequentially receives first to Xth SI according to scheduling periods and repeat times of the first to Xth SI in preset N pieces of SI, wherein N may be a positive integer larger than 1, X may be a positive integer larger than 1 and smaller than or equal to N, and the scheduling period and repeat times of the first SI may be preset, wherein the terminal may determine the scheduling periods and repeat times of the second to Xth SI through fields in the first SI.

An embodiment of the present disclosure further provides a method for transmitting SI, which may include that:

a base station may sequentially send first to Xth SI to a terminal according to scheduling periods and repeat times of the first to Xth SI in preset N pieces of SI, wherein N may be a positive integer larger than 1, X may be a positive integer larger than 1 and smaller than or equal to N, and the scheduling period and repeat times of the first SI may be preset, wherein the base station may notify the scheduling periods and repeat times of the second to Xth SI to the terminal through fields in the first SI.

An embodiment of the present disclosure further provides a base station, which may include:

a sending module, configured to sequentially send first to Xth SI according to scheduling periods and repeat times of the first to Xth SI in preset N pieces of SI, wherein N may be a positive integer larger than 1, X may be a positive integer larger than 1 and smaller than or equal to N, and the scheduling period and repeat times of the first SI may be preset; and the base station may further include: a notification module, configured to notify the scheduling periods and repeat times of the second to Xth SI through fields in the first SI.

An embodiment of the present disclosure further provides a terminal, which may include:

a receiving module, configured to sequentially receive first to Xth SI according to scheduling periods and repeat times of the first to Xth SI in preset N pieces of SI, wherein N may be a positive integer larger than 1, X may be a positive integer larger than 1 and smaller than or equal to N, and the scheduling period and repeat times of the first SI may be preset; and the terminal may further include: a determination module, configured to determine the scheduling periods and repeat times of the second to Xth SI through fields in the first SI.

An embodiment of the present disclosure further provides a system for transmitting SI, which may include the abovementioned base station and terminal.

According to the SI transmission method, base station, terminal and system provided by the embodiments of the present disclosure, the base station sequentially sends the first to Xth SI according to the scheduling periods and repeat times of the first to Xth SI in the preset N pieces of SI, wherein N is a positive integer larger than 1, and X is a positive integer larger than 1 and smaller than or equal to N; the scheduling period and repeat times of the first SI are preset; and the base station notifies the scheduling periods and repeat times of the second to Xth SI through the fields in the first SI. According to the embodiments of the present disclosure, control overhead and an access time delay may be reduced, and SI types and an SI transmission mechanism may be simplified, thereby solving the problems of high control overhead and long access time delay as well as incapability of reducing cost and complexity of a coverage-enhanced MTC terminal due to the various types of system information and complex transmission mechanism, when an SI transmission mechanism of an existing LTE system is applied to a coverage-enhanced MTC terminal.

BRIEF DESCRIPTION OF THE DRAWINGS

In the drawings (which may be not drawn to scale), similar reference signs may describe similar parts in different drawings. Similar reference signs with different suffix letters may represent different examples of similar parts. The drawings substantially show each embodiment discussed in the present disclosure not limitedly but exemplarily.

DETAILED DESCRIPTION

Figure 1:
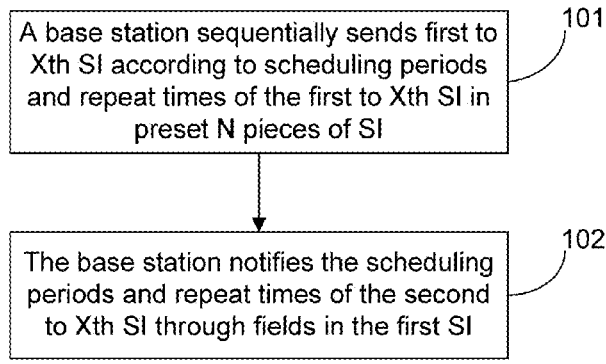
FIG. 1 is an implementation flowchart of an SI transmission method according to an embodiment of the present disclosure.

In order to make a purpose, technical solutions and advantages of the present disclosure clearer, embodiments of the present disclosure will be described below with reference to the drawings in detail. It is to be noted that the embodiments in the present disclosure and characteristics in the embodiments may be freely combined under the condition of no conflicts.

In an embodiment of the present disclosure: a base station sequentially sends first to Xth SI according to scheduling periods and repeat times of the first to Xth SI in preset N pieces of SI, wherein N is a positive integer larger than 1, and X is a positive integer larger than 1 and smaller than or equal to N; and the scheduling period and repeat times of the first SI are preset, wherein the scheduling periods and repeat times of the second to Xth SI is notified by the base station through fields in the first SI.

The method of the present disclosure will be described below with reference to the drawing and the embodiment.

The embodiment of the present disclosure provides a method for SI transmission, and as shown in FIG. 1, the method includes:

Step 101: a base station sequentially sends first to Xth SI according to scheduling periods and repeat times of the first to Xth SI in preset N pieces of SI, wherein the method further includes:

Step 102: the base station notifies the scheduling periods and repeat times of the second to Xth SI through fields in the first SI.

Here, N is a positive integer larger than 1, X is a positive integer larger than 1 and smaller than or equal to N, and the scheduling period and repeat times of the first SI are preset.

Specifically, as mentioned in Step 101, the operation that the base station sequentially sends the first to Xth SI according to the scheduling periods and repeat times of the first to Xth SI in the preset N pieces of SI belongs to a sending manner in a broadcast form, that is, the base station sends the SI and all terminals receive the SI.

Specifically, the base station sends X pieces of SI in the broadcast form.

Preferably, a value of N is 2, 3, 4 or 5.

Here, for a coverage-enhanced MTC terminal: first, most of SI contents included in the existing 16 SIBs may be unnecessary; and second, it is needed to introduce some SI contents specific to the terminal, for example, configuration information of radio frequency resource related to initial access of the terminal. In addition, a future system may support independent access of a coverage-enhanced MTC terminal and a normal LTE terminal, namely, may support the terminals to receive corresponding SI according to their respective terminal types. Therefore, in consideration of the abovementioned aspects, for SI of a coverage-enhanced MTC terminal, new SI structures including N (much smaller than existing 16) preset SI types may be set.

Preferably, the method further includes that:

when X is smaller than N, the base station sends (X+1)th to Nth SI in the preset N pieces of SI through a terminal-specific Radio Resource Control (RRC) message. Specifically, the operation that the base station sends the (X+1)th to Nth SI in the preset N pieces of SI through the terminal-specific RRC message belongs to a sending manner in a unicast form, that is, the base station sends the SI, but only one determined terminal receives the SI.

Specifically, the base station sends N-X pieces of SI in the unicast form.

Specifically, when the base station finds that the determined terminal needs at least one piece of SI in the (X+1)th to Nth SI, or, when the determined terminal requests the base station to send at least one piece of SI in the (X+1)th to Nth SI, for example, under a possible handover condition in a mobile scenario, the base station sends at least one piece of SI in the (X+1)th to Nth SI to the determined terminal through the terminal-specific RRC message. Sending SI which is not frequently used by the terminal through the terminal-specific RRC message reduces control overhead of the system.

Preferably, the method further includes that:

the base station sends the first to Xth SI through a preset logical resource block.

Here, for different sub-frames or timeslots, the same logical resource block may correspond to the same or different Physical Resource Blocks (PRBs).

Here, since a downlink data allocation bandwidth of the coverage-enhanced MTC terminal is reduced, allocation through a dynamic resource block of a PDCCH may not achieve a high gain. In addition, according to the method, the terminal may skip a PDCCH detection and directly detect SI born in a PDSCH, so that the control overhead and the access time delay of the system are reduced.

Preferably, any piece of SI in the preset N pieces of SI includes at least one of existing SIBs, or, is new SI specific to the coverage-enhanced MTC terminal, wherein inclusion of at least one piece of SI in the existing SIBs refers to: SI formed by a combination of at least one of the existing SIBs, for example, SI formed by existing SIB3 and existing SIB4, or SI formed by existing SIB3 or existing SIB4 only; and the new SI specific to the coverage-enhanced MTC terminal refers to: SI not formed by the combination of at least one of the existing SIBs, for example, SI including a part of contents of existing SIB1 or existing SIB2 and a new field, or SI including a part of contents of existing SIB3 and/or existing SIB4.

Preferably, the scheduling period of the first SI is an integral multiple of a duration of a radio frame.

Preferably, the second to Xth SI has the same or different scheduling periods; and the scheduling period of each of the second to Xth SI is an integral multiple of the scheduling period of the first SI, and is one of K preset scheduling periods, wherein K is a positive integer larger than 1.

Preferably, the second to Xth SI has the same or different repeat times; and the repeat times of each of the second to Xth SI is one of M preset repeat times, wherein M is a positive integer larger than 1.

Specifically, when the second to Xth SI has the same scheduling period, the number of bits of a field used to indicate the scheduling period of the second to Xth SI is:

ceiling(log$_2$K); and specifically, when the second to Xth SI has different scheduling periods, the number of bits of the field used to indicate the scheduling periods of the second to Xth SI is:

(X−1)·ceiling(log$_2$K), wherein any one of the second to Xth SI corresponds to ceiling(log$_2$ K) bits; and wherein log$_2$(•) represents operation of taking a logarithm with 2 as a base, and ceiling represents operation of rounding up to an integer.

Specifically, when the second to Xth SI has the same repeat times, the number of bits included in a field used to indicate the repeat times of the second to Xth SI is:

ceiling(log$_2$M);

specifically, when the second to Xth SI has different repeat times, the number of bits included in the field used to indicate the repeat times of the second to Xth SI is:

(X−1)·ceiling(log$_2$M), wherein any one of the second to Xth SI corresponds to ceiling(log$_2$ M) bits; and wherein log$_2$(•) represents operation of taking a logarithm with 2 as a base, and ceiling represents operation of rounding up to an integer.

Preferably, for the first SI, the step that the base station sequentially sends the first to Xth SI according to the scheduling periods and repeat times of the first to Xth SI in the preset N pieces of SI includes that:

radio frames of the first SI are determined according to the scheduling period of the first SI; and the first SI is sent through $R^{(1)}$ continuous sub-frames starting from a determined sub-frame within a range of the radio frames, wherein $R^{(1)}$ is the repeat times of the first SI.

Preferably, for nth SI, the step that the base station sequentially sends the first to Xth SI according to the scheduling periods and repeat times of the first to Xth SI in the preset N pieces of SI includes that:

radio frames of the nth SI are determined according to a scheduling period of the nth SI;

a first sub-frame which is for sending the first SI within a range of the radio frames of the nth SI is determined as reference sub-frames of the nth SI;

sub-frames for sending the nth SI are determined according to the repeat times of the first SI as well as reference sub-frames and repeat times of the second to nth SI; and the nth SI is sent through the determined sub-frames, wherein n is a positive integer larger than or equal to 2 and smaller than or equal to X, a set of the radio frames of the nth SI is included in a set of the radio frames of the first SI, and an interval between two adjacent sub-frames in the reference sub-frames of the nth SI is equal to the scheduling period of the nth SI.

Preferably, an index $IDX_{frame}^{(1)}$ of each radio frame of the first SI is determined according to the following equation:

$$\mod\left(IDX_{frame}^{(1)}, \frac{T^{(1)}}{D_{frame}}\right) = 0,$$

where $T^{(1)}$ represents the scheduling period of the first SI, $D_{frame}$ represents a duration of the each radio frame, and mod represents remainder calculation.

Preferably, an index $IDX_{frame}^{(n)}$ of each radio frame of the nth SI is determined according to the following equation:

$$\mod\left(IDX_{frame}^{(n)}, \frac{T^{(n)}}{D_{frame}}\right) = k^{(n)},$$

where $k^{(n)}$ represents an offset of the radio frame of the nth SI, and is an integral multiple of the number of the radio frames in the scheduling period of the first SI, $T^{(n)}$ represents the scheduling period of the nth SI, $D_{frame}$ represents a duration of each of the radio frames, and mod represents remainder calculation operation.

Preferably, the step that the sub-frames for sending the nth SI are determined according to the repeat times of the first SI as well as the reference sub-frames and repeat times of the second to nth SI includes that:

for any reference sub-frame of the nth SI, when n is equal to 2, sub-frame offsets of the sending sub-frames of the second SI corresponding to the reference sub-frame of the second SI are determined according to the repeat times of the first SI;

when n is larger than 2, sub-frame offsets of the sending sub-frames of the nth SI corresponding to the reference sub-frame of the nth SI are determined according to the repeat times of the first SI and repeat times of SI which also takes the sub-frame as a reference sub-frame in the second to (n−1)th SI;

the sending sub-frames of the nth SI corresponding to the reference sub-frame of the nth SI are determined according to the sub-frame offsets of the sending sub-frames of the nth SI corresponding to the reference sub-frame of the nth SI and the repeat times of the nth SI; and the sub-frames for sending the nth SI include: the sending sub-frames of the nth SI corresponding to all the reference sub-frames of the nth SI.

Preferably, the sub-frame offset $N_{i,Offset}^{(2)}$ of each sending sub-frame of the second SI corresponding to any reference sub-frame of the second SI is equal to the repeat times $R^{(1)}$ of the first SI, that is, the sending sub-frames of the second SI corresponding to all the reference sub-frames of the second SI have the same sub-frame offset, wherein i represents a sequence number of any reference sub-frame of the second SI.

Preferably, when n is larger than 2, the sub-frame $N_{i,Offset}^{(n)}$ of each sending sub-frame of the nth SI corresponding to any reference sub-frame of the nth SI is determined according to the following equation:

$$N_{i,Offset}^{n} = R^{(1)} + \sum_{j=1}^{L} R_j,$$

where i represents a sequence number of any reference sub-frame of the nth SI, L represents the number of pieces of SI which also take the reference sub-frame, with the sequence number i, of the nth SI as a reference sub-frame in the second to (n−1)th SI, $R_j$ represents repeat times of jth SI in the L pieces of SI, and $R^{(1)}$ represents the repeat times of the first SI.

Preferably, the sending sub-frames of the nth SI corresponding to any reference sub-frame of the nth SI are: $R^{(n)}$ continuous sub-frames starting from the $(N_{i,Offset}^{(n)})$th sub-frame after any reference sub-frame of the nth SI, wherein $N_{i,Offset}^{(n)}$ represents the sub-frame offset of each sending sub-frame of the nth SI corresponding to any reference sub-frame of the nth SI, i represents the sequence number of any reference sub-frame of the nth SI, and $R^{(n)}$ represents the repeat times of the nth SI.

Finally, the embodiment of the present disclosure further achieves the effect that SI can be sent in a centralized manner, that is, the second to Xth SI is sent close to the first SI; and SI acquisition time is reduced by the method, so that the system access time delay is further reduced.

Figure 2:
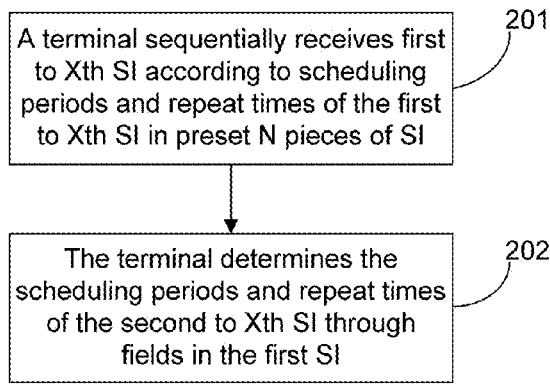
FIG. 2 is an implementation flowchart of an SI transmission method according to another embodiment of the present disclosure.

An embodiment of the present disclosure further provides an SI transmission method, as shown in FIG. 2, including:

Step 201: a terminal sequentially receives first to Xth SI according to scheduling periods and repeat times of the first to Xth SI in preset N pieces of SI, the method further includes Step 202: the terminal determines the scheduling periods and repeat times of the second to Xth SI through fields in the first SI, wherein N is a positive integer larger than 1, X is a positive integer larger than 1 and smaller than or equal to N, and the scheduling period and repeat times of the first SI are preset.

Here, any piece of SI in the preset N pieces of SI includes at least one of existing SIBs, or, is new SI specific to a coverage-enhanced MTC terminal.

Here, the scheduling period of the first SI is an integral multiple of a duration of a radio frame.

Here, the second to Xth SI has the same or different scheduling periods; and the scheduling period of each of the second to Xth SI is an integral multiple of the scheduling period of the first SI, and is one of K preset scheduling periods, wherein K is a positive integer larger than 1.

Preferably, the second to Xth SI has the same or different repeat times; and the repeat times of each of the second to Xth SI is one of M preset repeat times, wherein M is a positive integer larger than 1.

An embodiment of the present disclosure further provides an SI transmission method, which includes that:

a base station sequentially sends first to Xth SI according to scheduling periods and repeat times of the first to Xth SI in preset N pieces of SI, wherein N is a positive integer larger than 1, and X is a positive integer larger than 1 and smaller than or equal to N, and the scheduling period and repeat times of the first SI are preset, wherein the base station notifies the scheduling periods and repeat times of the second to Xth SI through fields in the first SI.

By the SI transmission method, which is optimized to be simpler and more feasible, provided by the embodiment of the present disclosure, control overhead and an access time delay are reduced, and SI types and an SI transmission mechanism are simplified, so that the problems of high control overhead and long access time delay as well as incapability of lowering cost and complexity of a coverage-enhanced MTC terminal due to the various types of system information and the complexity of a transmission mechanism in a situation that an SI transmission mechanism of an existing LTE system is applied to the coverage-enhanced MTC terminal.

It is to note that:

the radio frames of the first to Xth SI are not equivalent to the radio frames for sending the first to Xth SI in the embodiment of the present disclosure, wherein the radio frames of the first SI are radio frames where the starting sub-frames for first transmission of the first SI are located, and the radio frames of the second to Xth SI are radio frames where the reference sub-frames of the second to Xth SI are located.

The sub-frames used to transmit the first to Xth SI in the embodiment of the present disclosure are all available sub-frames;

specifically, the available sub-frames do not include:

downlink sub-frames of a Multicast/Broadcast Single Frequency Network (MBSFN) type, uplink sub-frames under a TDD configuration, downlink sub-frames without sufficient available resources, and the like. For the downlink sub-frames without sufficient available resources, for example, sub-frame 0 in an existing LTE system with a bandwidth of 1.4M, sub-frame 0 under such a condition is used to transmit information of an MIB, so that there may be no sufficient available resources for transmitting other SI.

According to different implementation manners, the terminal may execute independent decoding of the SI every time when receiving SI data, or, may combine multiple pieces of data received for many times and corresponding to the same SI and execute combined decoding of the SI according to the combined data.

For SI sent in a broadcast form, since SI with a smaller sequence number usually may include necessary information, for example: information related to cell access or scheduling information of other SI, the SI with the smaller sequence number has higher priority, or, compared with SI with a larger sequence number, the SI with the smaller sequence number is usually sent more frequently, and thus has a shorter scheduling period.

If there are no special description, the terminal in the embodiment of the present disclosure is a coverage-enhanced MTC terminal.

The present disclosure will be further described below with reference to specific embodiments in detail.

Embodiment 1

It is supposed that 3 (N=3) pieces of SI are preset for a coverage-enhanced MTC terminal and that the preset 3 (X=N=3) pieces of SI are transmitted in a broadcast form.

It is supposed that all of the 3 pieces of preset SI are transmitted through a preset logical resource block, for example, if a system bandwidth is 10M and includes 50 logical resource blocks, 6 logical resource blocks in the 50 logical resource blocks may be selected to transmit the SI, wherein for different sub-frames or timeslots, one of the 6 logical resource blocks may correspond to the same or different PRBs.

Figure 3:
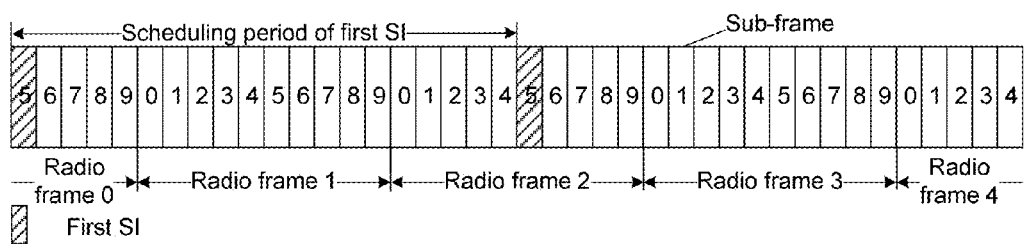
FIG. 3 is a first diagram of transmission of first SI according to an embodiment of the present disclosure.

FIG. 3 is a first diagram of transmission of first SI according to an embodiment of the present disclosure.

It is supposed that a preset scheduling period $T^{(1)}$ of first SI is 20 ms and repeat times $R^{(1)}$ is 1; since a duration $D_{frame}$ of each radio frame is 10 ms, the scheduling period $T^{(1)}$ is twice the duration $D_{frame}$ of the radio frame, wherein 1 ms is a duration of a sub-frame.

An index $IDX_{frame}^{(1)}$ of each radio frame of the first SI is determined according to the scheduling period $T^{(1)}$ of the first SI and the following equation:

$$\mod\left(IDX_{frame}^{(1)}, \frac{T^{(1)}}{D_{frame}}\right) = \mod(IDX_{frame}^{(1)}, 2) = 0,$$

that is, the radio frames of the first SI are radio frames all with even indexes, for example, radio frames with indexes 0, 2, 4 and the like.

The first SI is transmitted through one ($R^{(1)}=1$) sub-frame continuous from the sub-frame with index 5 within a range of the radio frames, that is, the first SI is transmitted through the sub-frame with index 5 within the range of the radio frames.

Figure 4:
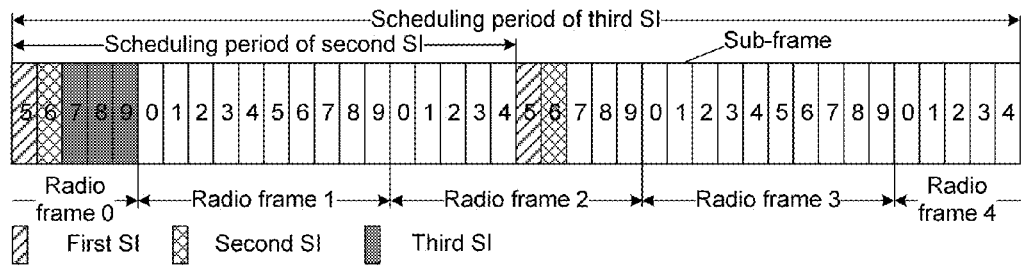
FIG. 4 is a first diagram of transmission of second and third SI according to an embodiment of the present disclosure.

FIG. 4 is a first diagram of transmission of second and third SI according to an embodiment of the present disclosure.

It is supposed that a scheduling period $T^{(2)}$ of second SI is 20 ms, and is equal to the scheduling period $T^{(1)}$ of the first SI, and repeat times $R^{(2)}$ is 1; and a scheduling period $T^{(3)}$ of third SI is 40 ms, and is equal to twice of the scheduling period $T^{(1)}$ of the first SI, and repeat times $R^{(3)}$ is 3.

Here, a base station notifies the scheduling periods and repeat times of the second and third SI to a terminal through fields in the first SI.

Here, the 1 repeat time of the second SI or the 3 repeat times of the third SI is one of M preset repeat times, wherein M is a positive integer larger than 1; for example, it may be supposed that M is equal to 4 in the embodiment, then 4 preset repeat times may include: {1,3,5,8}; and at this moment, since the repeat times of the second and third SI are different, the field used to indicate the repeat times of the second and third SI includes totally 4·(2·log$_2$ 4) bits.

Here, the scheduling period 20 ms of the second SI or the scheduling period 40 ms of the third SI is one of K preset scheduling periods, wherein K is a positive integer larger than 1; for example, it may be supposed that K is equal to 4 in the embodiment, then 4 preset scheduling periods may include: {20,40,80, 160}; and at this moment, since the scheduling periods of the second and third SI may be different, the field used to indicate the scheduling periods of the second and third SI includes totally 4·(2·log$_2$ 4) bits.

An index $IDX_{frame}^{(2)}$ of each radio frame of the second SI is determined according to the scheduling period $T^{(2)}$ of the second SI and the following equation:

$$\mod\left(IDX_{frame}^{(2)}, \frac{T^{(2)}}{D_{frame}}\right) = \mod(IDX_{frame}^{(2)}, 2) = 0,$$

that is, the radio frames of the second SI are radio frames all with even indexes, for example, radio frames with indexes 0, 2, 4 and the like; and first sub-frame, i.e. sub-frame with index 5, for transmitting the first SI within a range of the radio frames of the second SI is determined as reference sub-frames of the second SI, wherein an interval between two adjacent sub-frames in the reference sub-frames of the second SI is equal to the scheduling period of the second SI.

For any reference sub-frame of the second SI, a sub-frame offset $N_{i,Offset}^{(2)}$ of each transmission sub-frame of the second SI corresponding to any reference sub-frame of the second SI is determined to be equal to the repeat times $R^{(1)}$ of the first SI, specifically:

$$N_{i,Offset}^{(2)} = R^{(1)} = 1;$$

one ($R^{(2)}=1$) continuous sub-frame starting from a first ($N_{i,Offset}^{(2)}=1$) sub-frame after any reference sub-frame of the second SI, i.e. the first sub-frame after any reference sub-frame of the second SI, is determined as a transmission sub-frame of the second SI corresponding to any reference sub-frame of the second SI; and sub-frames for transmitting the second SI include: transmission sub-frames of the second SI corresponding to all the reference sub-frames of the second SI.

The second SI is transmitted through the sub-frames for transmitting the second SI.

An index $IDX_{frame}^{(3)}$ of each radio frame of the third SI is determined according to the scheduling period $T^{(3)}$ of the third SI and the following equation:

$$\mod\left(IDX_{frame}^{(3)}, \frac{T^{(3)}}{D_{frame}}\right) = \mod(IDX_{frame}^{(3)}, 4) = 0,$$

that is, the radio frames of the third SI are radio frames all with indexes which may be exactly divided by 4, for example, radio frames with indexes 0, 4, 8 and the like; and first sub-frame, i.e. the sub-frame with index 5, for transmitting the first SI within a range of the radio frames of the third SI is taken as reference sub-frames of the third SI, wherein an interval between two adjacent sub-frames in the reference sub-frames of the third SI is equal to the scheduling period of the third SI.

Any reference sub-frame of the third SI is also the reference sub-frame of the second SI.

For any reference sub-frame of the third SI, a sub-frame offset $N_{i,Offset}^{(3)}$ of each transmission sub-frame of the third SI corresponding to any reference sub-frame of the third SI is determined to be equal to a sum of the repeat times $R^{(1)}$ of the first SI and the repeat times $R^{(2)}$ of the second SI, specifically:

$$N_{i,Offset}^{(3)} = R^{(1)} + R^{(2)} = 1 + 1 = 2;$$

$3(R^{(3)}=3)$ continuous sub-frames starting from a second $(N_{i,Offset}^{(3)}=2)$ sub-frame after any reference sub-frame of the third SI are determined as transmission sub-frames of the third SI corresponding to any reference sub-frame of the third SI; and sub-frames for transmitting the third SI include: transmission sub-frames of the third SI corresponding to all the reference sub-frames of the third SI.

The third SI is transmitted through the sub-frames for transmitting the third SI.

Embodiment 2

It is supposed that 3 (N=3) pieces of SI are preset for a coverage-enhanced MTC terminal and that the preset 3 (X=N=3) pieces of SI are transmitted in a broadcast form.

It is supposed that all of the preset 3 pieces of SI are transmitted through a preset logical resource block, and for example, if a system bandwidth is 10M and includes 50 logical resource blocks, 6 logical resource blocks in the 50 logical resource blocks may be selected to transmit the SI, wherein for different sub-frames or timeslots, one of the 6 logical resource blocks may correspond to the same or different PRBs.

FIG. 3 is a first diagram of transmission of first SI according to an embodiment of the present disclosure.

It is supposed that a preset scheduling period $T^{(1)}$ of first SI is 20 ms and repeat times $R^{(1)}$ is 1; and since a duration $D_{frame}$ of each radio frame is 10 ms, the scheduling period $T^{(1)}$ is twice the duration $D_{frame}$ of the radio frame, wherein 1 ms is a duration of a sub-frame.

An index $IDX_{frame}^{(1)}$ of each radio frame of the first SI is determined according to the scheduling period $T^{(1)}$ of the first SI and the following equation:

$$\mod\left(IDX_{frame}^{(1)}, \frac{T^{(1)}}{D_{frame}}\right) = \mod(IDX_{frame}^{(1)}, 2) = 0,$$

that is, the radio frames of the first SI are radio frames all with even indexes, for example, radio frames with indexes 0, 2, 4 and the like.

The first SI is transmitted through one ($R^{(1)}=1$) continuous sub-frame starting from sub-frame with index 5 within a range of the radio frames, that is, the first SI is transmitted through the sub-frame with index 5 within the range of the radio frames.

Figure 5:
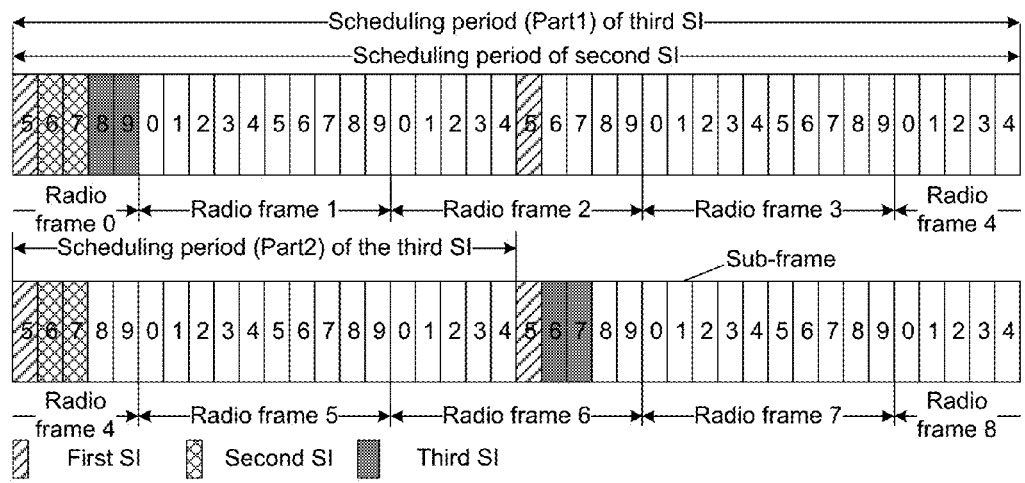
FIG. 5 is a second diagram of transmission of second and third SI according to an embodiment of the present disclosure.

FIG. 5 is a second diagram of transmission of second and third SI according to an embodiment of the present disclosure.

It is supposed that a scheduling period $T^{(2)}$ of second SI is 40 ms, and is equal to twice of the scheduling period $T^{(1)}$ of the first SI, and repeat times $R^{(2)}$ is 2; and it is supposed that a scheduling period $T^{(3)}$ of third SI is 60 ms, and is equal to triple of the scheduling period $T^{(1)}$ of the first SI, and repeat times $R^{(3)}$ is 2.

Here, a base station notifies the scheduling periods and repeat times of the second and third SI to a terminal through fields in the first SI.

Here, the repeat times 2 of the second SI or the third SI is one of M preset repeat times, wherein M is a positive integer larger than 1;

for example, it may be supposed that M is equal to 4 in the embodiment, then 4 preset repeat times may include: {1,2,4,8}; and at this moment, since the repeat times of the second and third SI may be different, the field used to indicate the repeat times of the second and third SI includes totally 4(2·log₂ 4) bits, otherwise includes 2(log₂ 4) bits.

Here, the scheduling period 40 ms of the second SI or the scheduling period 60 ms of the third SI is one of K preset scheduling periods, wherein K is a positive integer larger than 1; for example, it may be supposed that K is equal to 4 in the embodiment, then 4 preset scheduling periods may include: {20,40,60, 120}; and here, since the scheduling periods of the second and third SI may be different, the field used to indicate the scheduling periods of the second and third SI includes totally 4(2·log₂ 4) bits.

An index $IDX_{frame}^{(2)}$ of each radio frame of the second SI is determined according to the scheduling period $T^{(2)}$ of the second SI and the following equation:

$$\mod\left(IDX_{frame}^{(2)}, \frac{T^{(2)}}{D_{frame}}\right) = \mod(IDX_{frame}^{(2)}, 4) = 0,$$

that is, the radio frames of the second SI are radio frames all with indexes which may be exactly divided by 4, for example, radio frames with indexes 0, 4, 8 and the like; and first sub-frame, i.e. sub-frame with index 5, for transmitting the first SI within a range of the radio frames of the second SI is taken as reference sub-frames of the second SI, wherein an interval between two adjacent sub-frames in the reference sub-frames of the second SI is equal to the scheduling period of the second SI.

For any reference sub-frame of the second SI,
a sub-frame offset $N_{i,Offset}^{(2)}$ of each transmission sub-frame of the second SI corresponding to any reference sub-frame of the second SI is determined to be equal to the repeat times $R^{(1)}$ of the first SI, specifically:

$$N_{i,Offset}^{(2)}=R^{(1)}=1.$$

$2(R^{(2)}=2)$ continuous sub-frames starting from a first $(N_{i,Offset}^{(2)}=1)$ sub-frame after any reference sub-frame of the second SI are taken as transmission sub-frames of the second SI corresponding to any reference sub-frame of the second SI; and sub-frames for transmitting the second SI include: transmission sub-frames of the second SI corresponding to all the reference sub-frames of the second SI.

The second SI is transmitted through the sub-frames for transmitting the second SI.

An index $IDX_{frame}^{(3)}$ of each radio frame of the third SI is determined according to the scheduling period $T^{(3)}$ of the third SI and the following equation:

$$\mod\left(IDX_{frame}^{(3)}, \frac{T^{(3)}}{D_{frame}}\right) = \mod(IDX_{frame}^{(3)}, 6) = 0,$$

that is, the radio frames of the third SI are radio frames all with indexes which may be exactly divided by 6, for example, radio frames with indexes 0, 6, 12 and the like; and first sub-frame, i.e. the sub-frame with index 5, for transmitting the first SI within a range of the radio frames of the third SI is taken as reference sub-frames of the third SI, wherein an interval between two adjacent sub-frames in the reference sub-frames of the third SI is equal to the scheduling period of the third SI.

All the reference sub-frames of the third SI are divided into two types as follows:

reference sub-frames within a range of radio frames with indexes which may be exactly divided by 4; and other reference sub-frames.

Here, any first type of reference sub-frame of the third SI is also the reference sub-frame of the second SI.

For any first type of reference sub-frame of the third SI,
a sub-frame offset $N_{i1,Offset}^{(3)}$ of each transmission sub-frame of the third SI corresponding to any first type of reference sub-frame of the third SI is determined to be equal to a sum of the repeat times $R^{(1)}$ of the first SI and the repeat times $R^{(2)}$ of the second SI, specifically:

$$N_{i1,Offset}^{(3)}=R^{(1)}+R^{(2)}=1+2=3;$$

$2 (R^{(3)}=2)$ continuous sub-frames starting from a third $(N_{i1,Offset}^{(3)}=3)$ sub-frame after any first type of reference sub-frame of the third SI are taken as transmission sub-frames of the third SI corresponding to any first type of reference sub-frame of the third SI.

For any second type of reference sub-frame of the third SI,
a sub-frame offset $N_{i2,Offset}^{(3)}$ of each transmission sub-frame of the third SI corresponding to any second type of reference sub-frame of the third SI is determined to be equal to the repeat times $R^{(1)}$ of the first SI, specifically:

$$N_{i2,Offset}^{(3)}=R^{(1)}=1;$$

$2 (R^{(3)}=2)$ continuous sub-frames starting from a first $(N_{i2,Offset}^{(3)}=1)$ sub-frame after any second type of reference sub-frame of the third SI are taken as transmission sub-frames of the third SI corresponding to any second type of reference sub-frame of the third SI.

Sub-frames for transmitting the third SI include: transmission sub-frames of the third SI corresponding to all the reference sub-frames of the first type and all the reference sub-frames of the second type of the third SI.

The third SI is transmitted through the sub-frames for transmitting the third SI.

Embodiment 3

It is supposed that 3 (N=3) pieces of SI are preset for a coverage-enhanced MTC terminal and that the 3 (X=N=3) preset pieces of SI are transmitted in a broadcast form.

It is supposed that all of the 3 preset pieces of SI are transmitted through a preset logical resource block, and for example, if a system bandwidth is 10M and includes 50 logical resource blocks, 6 logical resource blocks in the 50 logical resource blocks may be selected to transmit the SI, wherein for different sub-frames or timeslots, one of the 6 logical resource blocks may correspond to the same or different PRBs.

Figure 6:
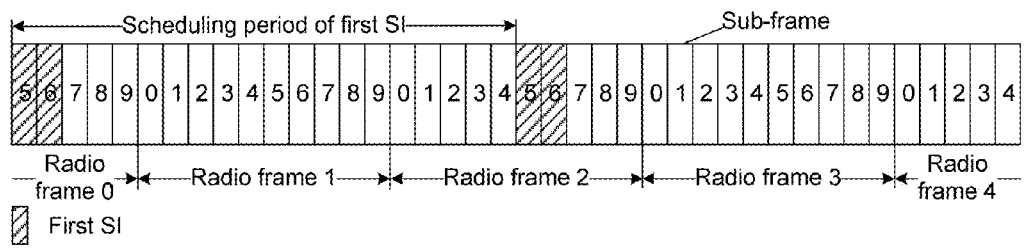
FIG. 6 is a second diagram of transmission of first SI according to an embodiment of the present disclosure.

FIG. 6 is a second diagram of transmission of first SI according to an embodiment of the present disclosure.

It is supposed that a preset scheduling period $T^{(1)}$ of first SI is 20 ms and repeat times $R^{(1)}$ is 2; and since a duration $D_{frame}$ of each radio frame is 10 ms, the scheduling period $T^{(1)}$ is twice the duration $D_{frame}$ of the radio frame, wherein 1 ms is a duration of a sub-frame.

An index $IDX_{frame}^{(1)}$ of each radio frame of the first SI is determined according to the scheduling period $T^{(1)}$ of the first SI and the following equation:

$$\mod\left(IDX_{frame}^{(1)}, \frac{T^{(1)}}{D_{frame}}\right) = \mod(IDX_{frame}^{(1)}, 2) = 0,$$

that is, the radio frames of the first SI are radio frames all with even indexes, for example, radio frames with indexes 0, 2, 4 and the like.

The first SI is transmitted through 2 ($R^{(1)}=2$) continuous sub-frames starting from sub-frame with index 5 within a range of the radio frames.

Figure 7:
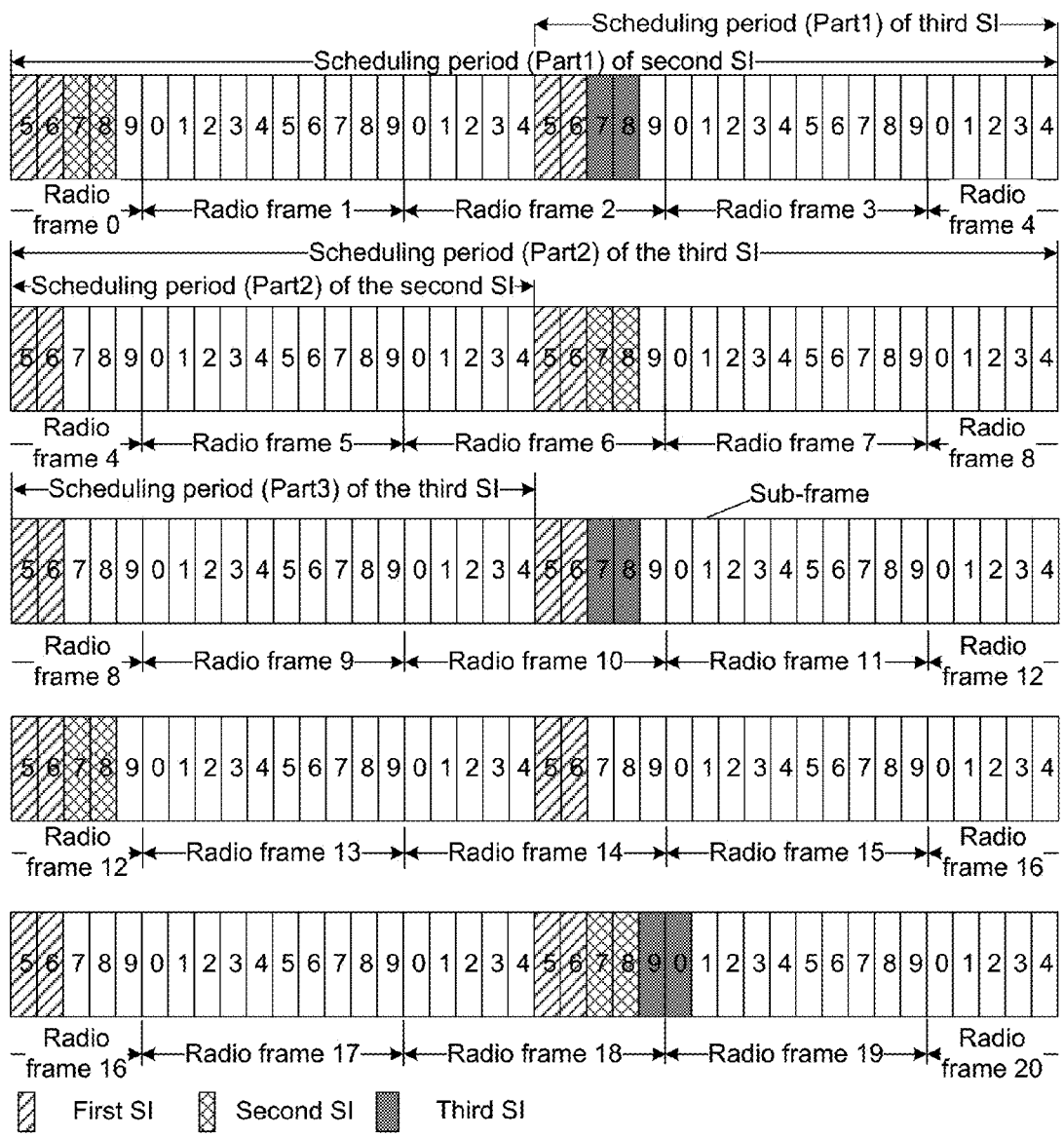
FIG. 7 is a third diagram of transmission of second and third SI according to an embodiment of the present disclosure.

FIG. 7 is a third diagram of transmission of second and third SI according to an embodiment of the present disclosure.

It is supposed that a scheduling period $T^{(2)}$ of second SI is 60 ms, and is equal to triple of the scheduling period $T^{(1)}$ of the first SI, and repeat times $R^{(2)}$ is 2; and it is supposed that a scheduling period $T^{(3)}$ of third SI is 80 ms, and is equal to quadruple of the scheduling period $T^{(1)}$ of the first SI, and repeat times $R^{(3)}$ is 2.

Here, a base station notifies the scheduling periods and repeat times of the second and third SI to a terminal through fields in the first SI.

Here, the repeat times 2 of the second SI or the third SI is one of M preset repeat times, wherein M is a positive integer larger than 1;

for example, it may be supposed that M is equal to 4 in the embodiment, then 4 preset repeat times may include: {1,2,4,8}; and at this moment, if the repeat times of the second and third SI may be different, the field used to indicate the repeat times of the second and third SI includes totally 4(2·$\log_2$ 4) bits, otherwise includes 2($\log_2$ 4) bits.

Here, the scheduling period 60 ms of the second SI or the scheduling period 80 ms of the third SI is one of K preset scheduling periods, wherein K is a positive integer larger than 1; for example, it may be supposed that K is equal to 4 in the embodiment, then 4 preset scheduling periods may include: {20,60,80, 120};

here, since the scheduling periods of the second and third SI may be different, the field used to indicate the scheduling periods of the second and third SI includes totally $4(2 \cdot \log_2 4)$ bits.

An index $IDX_{frame}^{(2)}$ of each radio frame of the second SI is determined according to the scheduling period $T^{(2)}$ of the second SI and the following equation:

$$\mathrm{mod}\left(IDX_{frame}^{(2)}, \frac{T^{(2)}}{D_{frame}}\right) = \mathrm{mod}(IDX_{frame}^{(2)}, 6) = 0,$$

that is, the radio frames of the second SI are radio frames all with indexes which may be exactly divided by 6, for example, radio frames with indexes 0, 6, 12 and the like; and first sub-frame, i.e. sub-frame with index 5, for transmitting the first SI within a range of the radio frames of the second SI is taken as reference sub-frames of the second SI, wherein an interval between two adjacent sub-frames in the reference sub-frames of the second SI is equal to the scheduling period of the second SI.

For any reference sub-frame of the second SI, a sub-frame offset $N_{i,Offset}^{(2)}$ of each transmission sub-frame of the second SI corresponding to any reference sub-frame of the second SI is determined to be equal to the repeat times $R^{(1)}$ of the first SI, specifically:

$$N_{i,Offset}^{(2)} = R^{(1)} = 2;$$

2 ($R^{(2)}=2$) continuous sub-frames starting from a second ($N_{i,Offset}^{(2)}=2$) sub-frame after any reference sub-frame of the second SI are determined as transmission sub-frames of the second SI corresponding to any reference sub-frame of the second SI; and sub-frames for transmitting the second SI include: transmission sub-frames of the second SI corresponding to all the reference sub-frames of the second SI.

The second SI is transmitted through the sub-frames for transmitting the second SI.

An index $IDX_{frame}^{(3)}$ of each radio frame of the third SI is determined according to the scheduling period $T^{(3)}$ of the third SI and the following equation:

$$\mathrm{mod}\left(IDX_{frame}^{(3)}, \frac{T^{(3)}}{D_{frame}}\right) = \mathrm{mod}(IDX_{frame}^{(3)}, 8) = 2,$$

that is, the radio frames of the third SI are radio frames all with indexes which may be divided by 8 with a remainder 2, for example, radio frames with indexes 2, 10, 18 and the like; and first sub-frame, i.e. the sub-frame with index 5, for transmitting the first SI within a range of the radio frames of the third SI is taken as reference sub-frames of the third SI, wherein an interval between two adjacent sub-frames in the reference sub-frames of the third SI is equal to the scheduling period of the third SI.

All the reference sub-frames of the third SI are divided into two types as follows:

reference sub-frames within a range of radio frames (for example, a radio frame with index 8) with indexes which may be exactly divided by 6; and other reference sub-frames.

Here, any first type of reference sub-frame of the third SI is also the reference sub-frame of the second SI.

For any first type of reference sub-frame of the third SI, a sub-frame offset $N_{i1,Offset}^{(3)}$ of each transmission sub-frame of the third SI corresponding to any first type of reference sub-frame of the third SI is determined to be equal to a sum of the repeat times $R^{(1)}$ of the first SI and the repeat times $R^{(2)}$ of the second SI, specifically:

$$N_{i1,Offset}^{(3)} = R^{(1)} + R^{(2)} = 2+2=4.$$

2 ($R^{(3)}=2$) continuous sub-frames starting from a fourth ($N_{i1,Offset}^{(3)}=4$) sub-frame after any first type of reference sub-frame of the third SI are determined as transmission sub-frames of the third SI corresponding to any first type of reference sub-frame of the third SI.

For any second type of reference sub-frame of the third SI, a sub-frame offset $N_{i2,Offset}^{(3)}$ of each transmission sub-frame of the third SI corresponding to any second type of reference sub-frame of the third SI is determined to be equal to the repeat times $R^{(1)}$ of the first SI, specifically:

$$N_{i2,Offset}^{(3)} = R^{(1)} = 2.$$

2 ($R^{(3)}=2$) continuous sub-frames starting from a second ($N_{i2,Offset}^{(3)}=2$) sub-frame after any second type of reference sub-frame of the third SI are determined as transmission sub-frames of the third SI corresponding to any second type of reference sub-frame of the third SI.

Sub-frames for transmitting the third SI include: transmission sub-frames of the third SI corresponding to all the first type of reference sub-frames and all the second type of reference sub-frames of the third SI.

The third SI is transmitted through the sub-frames for transmitting the third SI.

Embodiment 4

It is supposed that 5 (N=5) pieces of SI are preset for a coverage-enhanced MTC terminal, that the first 3 (X=3) pieces of SI (i.e. first, second and third SI) in the 5 preset pieces of SI are transmitted in a broadcast form and that the latter 2 (N−X=2) pieces of SI (i.e. fourth and fifth SI) in the 5 preset pieces of SI are transmitted in a unicast form.

Specifically, the first, second and third pieces of SI are sequentially transmitted according to scheduling periods and repeat times of the first, second and third pieces of SI and in manners mentioned in embodiment 1, embodiment 2 or embodiment 3.

Specifically, a base station sends the fourth SI through an RRC message specific to a terminal, including that:

Downlink Control Information (DCI) corresponding to the RRC message which bears the fourth SI is sent through a PDCCH, wherein the DCI includes a transmission parameter of the RRC message which bears the fourth SI, and The terminal-specific RRC message, which bears the fourth SI, is sent through a PUSCH according to the transmission parameter of the RRC message which bears the fourth SI.

Specifically, the terminal receives the fourth SI through the terminal-specific RRC message, including that:

the DCI corresponding to the RRC message which bears the fourth SI is received through the PDCCH, wherein the DCI includes the transmission parameter of the RRC message which bears the fourth SI, and the terminal-specific RRC message, which bears the fourth SI, is received through the PUSCH according to the transmission parameter of the RRC message which bears the fourth SI.

Specifically, the base station sends the fifth SI through a terminal-specific RRC message, including that:

DCI corresponding to the RRC message which contains the fifth SI is sent through the PDCCH, wherein the DCI includes a transmission parameter of the RRC message which bears the fifth SI, and the terminal-specific RRC message, which bears the fifth SI, is sent through the PUSCH according to a transmission parameter of the RRC message which bears the fifth SI.

Specifically, the terminal receives the fifth SI through the RRC message specific to the terminal, including that:

the DCI corresponding to the RRC message which contains the fifth SI is received through the PDCCH, wherein the DCI includes the transmission parameter of the RRC message which bears the fifth SI, and the terminal-specific RRC message, which bears the fifth SI, is received through the PUSCH according to the transmission parameter of the RRC message which bears the fifth SI.

Here, in order to improve coverage, transmission on the PDCCH and/or the PUSCH may also be implemented according to determined repeat times, that is, multiple sub-frames are occupied by one transmission.

Figure 8:
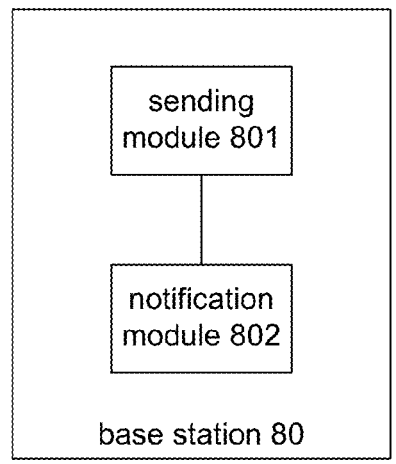
FIG. 8 is a structure diagram of a base station according to an embodiment of the present disclosure.

An embodiment of the present disclosure further provides a base station, and as shown in FIG. 8, the base station 80 includes:

a sending module 801, configured to sequentially send first to Xth SI according to scheduling periods and repeat times of the first to Xth SI in preset N pieces of SI, wherein N is a positive integer larger than 1, X is a positive integer larger than 1 and smaller than or equal to N, and the scheduling period and repeat times of the first SI are preset; and the base station 80 further includes: a notification module 802, configured to notify the scheduling periods and repeat times of the second to Xth SI through fields in the first SI.

Preferably, the sending module 801 is further configured to, when X is smaller than X, send (X+1)th to Nth SI in the preset N pieces of SI through a specific RRC message of a terminal.

Preferably, the sending module 801 is further configured to send the first to Xth SI through a preset logical resource block.

Here, for nth SI, the operation that the sending module 801 sequentially sends the first to Xth SI according to the scheduling periods and repeat times of the first to Xth SI in the preset N pieces of SI includes that:

the sending module 801 is configured to determine radio frames of the nth SI according to a scheduling period of the nth SI;

a first sub-frame which is for sending the first SI within a range of the radio frames of the nth SI is taken as reference sub-frames of the nth SI;

sub-frames for sending the nth SI are determined according to the repeat times of the first SI and reference sub-frames and repeat times of the second to nth SI; and the nth SI is sent through the determined sub-frames, wherein n is a positive integer larger than or equal to 2 and smaller than or equal to X, a set of the radio frames of the nth SI is included in a set of the radio frames of the first SI, and an interval between two adjacent sub-frames in the reference sub-frames of the nth SI is equal to the scheduling period of the nth SI.

In the embodiment of the present disclosure, the sending module 801 and the notification module 802 may be implemented by a Central Processing Unit (CPU), Digital Signal Processor (DSP) or Field-Programmable Gate Array (FPGA) in the base station 80.

Figure 9:
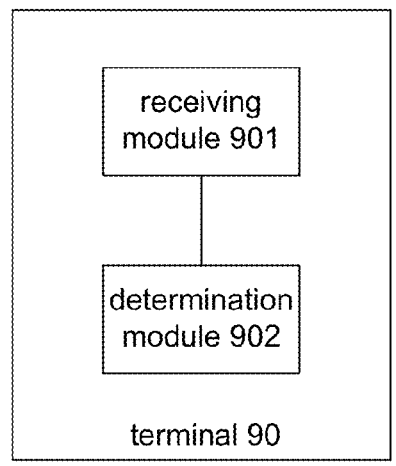
FIG. 9 is a structure diagram of a terminal according to an embodiment of the present disclosure.

An embodiment of the present disclosure further provides a terminal, and as shown in FIG. 9, the terminal 90 includes:

a receiving module 901, configured to sequentially receive first to Xth SI according to scheduling periods and repeat times of the first to Xth SI in preset N pieces of SI, wherein N is a positive integer larger than 1, X is a positive integer larger than 1 and smaller than or equal to N, and the scheduling period and repeat times of the first SI are preset; and the terminal 90 further includes: a determination module 902, configured to determine the scheduling periods and repeat times of the second to Xth SI through fields in the first SI.

In the embodiment of the present disclosure, the receiving module 901 and the determination module 902 may be implemented by a CPU, DSP OR FPGA in the terminal 90.

Figure 10:
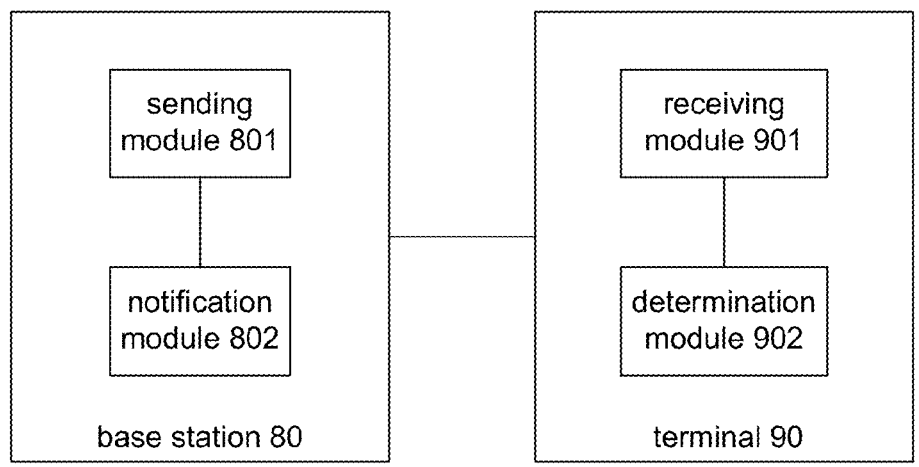
FIG. 10 is a structure diagram of an SI transmission system according to an embodiment of the present disclosure.

An embodiment of the present disclosure further provides an SI transmission system, as shown in FIG. 10, including:

the abovementioned base station 80 and terminal 90.

By the SI transmission method and device, which are optimized to be simpler and more feasible, described by the embodiments of the present disclosure, control overhead and an access time delay may be reduced, and SI types and an SI transmission mechanism may be simplified, thereby solving the problems of high control overhead and long access time delay as well as incapability of lowering cost and complexity of a coverage-enhanced MTC terminal, caused by existence of various types of system information and complexity of a transmission mechanism, in a situation that an SI transmission mechanism of an existing LTE system is applied to the coverage-enhanced MTC terminal.

Those skilled in the art should know that the embodiments of the present disclosure may be provided as a method, a system or a computer program product. Therefore, the embodiments may be a pure hardware embodiment, a pure software embodiment and a combined software and hardware embodiment. Moreover, the embodiments may adopt a form of computer program product implemented on one or more computer-available storage media (including, but not limited to, a disk memory, an optical memory and the like) including computer-available program codes.

The present disclosure may be described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or other programmable data processing equipment.

The above are only embodiments of the present disclosure and not intended to limit the scope of patent of the present disclosure.

What is claimed is:

1. A method for transmitting System Information (SI), comprising:
   sequentially sending, by a base station, first to Xth SI to terminals according to scheduling periods and repeat times of the first to Xth SI in preset N pieces of SI, so that the terminals perform corresponding operations according to the first to Xth SI;
   wherein N is a positive integer larger than 1, X is a positive integer larger than 1 and smaller than or equal to N, and the scheduling period and repeat times of the first SI are preset,
   wherein the scheduling periods and repeat times of the second to Xth SI are notified to the terminals by the base station through fields in the first SI;
   wherein any piece of SI in the preset N pieces of SI comprises: at least one of existing System Information Blocks (SIBs), or new SI specific to a coverage-enhanced Machine Type Communication (MTC) terminal.

2. The method according to claim 1, further comprising: when X is smaller than N, sending, by the base station, (X+1)th to Nth SI in the preset N pieces of SI to a terminal through a terminal-specific Radio Resource Control (RRC) message.

3. The method according to claim 1, further comprising: sending, by the base station, the first to Xth SI to the terminals through a preset logical resource block.

4. The method according to claim 1, wherein the scheduling period of the first SI is an integral multiple of a duration of a radio frame;
   the second to Xth SI has a same or different scheduling periods; and
   the scheduling period of each of the second to Xth SI is an integral multiple of the scheduling period of the first SI, and is one of K preset scheduling periods,
   wherein K is a positive integer larger than 1.

5. The method according to claim 1, wherein the second to Xth SI has same or different repeat times; and
   the repeat times of each of the second to Xth SI is one of M preset repeat times, wherein M is a positive integer larger than 1.

6. The method according to claim 1, wherein, for the first SI, sequentially sending, by the base station, the first to Xth SI to the terminals according to the scheduling periods and repeat times of the first to Xth SI in the preset N pieces of SI comprises:
   determining radio frames of the first SI according to the scheduling period of the first SI; and
   sending the first SI through $R^{(1)}$ continuous sub-frames starting from a determined sub-frame within a range of the radio frames, wherein $R^{(1)}$ is the repeat times of the first SI.

7. The method according to claim 6, wherein an index $IDX_{frame}^{(1)}$ of each radio frame of the first SI is determined according to the following equation:

$$\mod\left(IDX_{frame}^{(1)}, \frac{T^{(1)}}{D_{frame}}\right) = 0,$$

where the $T^{(1)}$ represents the scheduling period of the first SI, the $D_{frame}$ represents a duration of each of the radio frames, and mod represents a remainder calculation.

8. The method according to claim 1, wherein, for nth SI, sequentially sending, by the base station, the first to Xth SI to the terminals according to the scheduling periods and repeat times of the first to Xth SI in the preset N pieces of SI comprises:
   determining radio frames of the nth SI according to a scheduling period of the nth SI;
   taking a first sub-frame which is for sending the first SI within a range of the radio frames of the nth SI to be reference sub-frames of the nth SI;
   determining sub-frames for sending the nth SI according to the repeat times of the first SI and reference sub-frames and repeat times of the second to nth SI; and
   sending the nth SI through the determined sub-frames,
   wherein n is a positive integer larger than or equal to 2 and smaller than or equal to X, a set of the radio frames of the nth SI is included in a set of the radio frames of the first SI, and an interval between two adjacent sub-frames in the reference sub-frames of the nth SI is equal to the scheduling period of the nth SI.

9. The method according to claim 8, wherein an index $IDX_{frame}^{(n)}$ of each of the radio frames of the nth SI is determined according to the following equation:

$$\mod\left(IDX_{frame}^{(n)}, \frac{T^{(n)}}{D_{frame}}\right) = k^{(n)},$$

where $K^{(n)}$ represents an offset of each of the radio frames of the nth SI, and is an integral multiple of the number of the radio frames in the scheduling period of the first SI, $T^{(n)}$ represents the scheduling period of the nth SI, $D_{frame}$ represents a duration of each of the radio frames, and mod represents a remainder calculation.

10. The method according to claim 9, wherein determining the sub-frames for sending the nth SI according to the repeat times of the first SI and the reference sub-frames and repeat times of the second to nth SI comprises:
   for any reference sub-frame of the nth SI,
   when n is equal to 2, determining sub-frame offsets of sending sub-frames of the second SI corresponding to the reference sub-frame of the second SI according to the repeat times of the first SI;
   when n is larger than 2, determining sub-frame offsets of sending sub-frames of the nth SI corresponding to the reference sub-frame of the nth SI according to the repeat times of the first SI and repeat times of SI which also takes the sub-frame as a reference sub-frame in the second to (n−1)th SI;

determining the sending sub-frames of the nth SI corresponding to the reference sub-frame of the nth SI according to the sub-frame offsets of the sending sub-frames of the nth SI corresponding to the reference sub-frame of the nth SI and the repeat times of the nth SI; and the sub-frames for sending the nth SI comprise: sending sub-frames of the nth SI corresponding to all the reference sub-frames of the nth SI.

11. The method according to claim 10, wherein a sub-frame offset $N_{i,Offset}^2$ of each of the sending sub-frames of the second SI corresponding to any reference sub-frame of the second SI is equal to the repeat times $R^{(1)}$ of the first SI, that is, the sending sub-frames of the second SI corresponding to all the reference sub-frames of the second SI have the same sub-frame offset, wherein i represents a sequence number of any reference sub-frame of the second SI.

12. The method according to claim 10, wherein, when n is larger than 2, a sub-frame $N_{i,offset}^n$ of each of the sending sub-frames of the nth SI corresponding to any reference sub-frame of the nth SI is determined according to the following equation:

$$N_{i,Offset}^n = R^{(1)} + \sum_{j=1}^{L} R_j,$$

where i represents a sequence number of any reference sub-frame of the nth SI, L represents the number of pieces of SI which also take the reference sub-frame, with the sequence number i, of the nth SI as a reference sub-frame in the second to (n−1)th SI, $R_j$ represents repeat times of jth SI in the L pieces of SI, and $R^{(1)}$ represents the repeat times of the first SI.

13. The method according to claim 10, wherein the sending sub-frames of the nth SI corresponding to any reference sub-frame of the nth SI are:

$R^{(n)}$ continuous sub-frames starting from the $(N_{i,offset}^n)$th sub-frame after any reference sub-frame of the nth SI, wherein $N_{i,Offset}^n$ represents a sub-frame offset of each of the sending sub-frames of the nth SI corresponding to any reference sub-frame of the nth SI, i represents a sequence number of any reference sub-frame of the nth SI, and $R^{(n)}$ represents the repeat times of the nth SI.

14. A method for receiving System Information (SI), comprising:

sequentially receiving, by a terminal from a base station, first to Xth SI according to scheduling periods and repeat times of the first to Xth SI in preset N pieces of SI, and performing corresponding operations according to the first to Xth SI;

wherein N is a positive integer larger than 1, X is a positive integer larger than 1 and smaller than or equal to N, and the scheduling period and repeat times of the first SI are preset, wherein the scheduling periods and repeat times of the second to Xth SI are determined by the terminal through fields in the first SI sent by the base station;

wherein any piece of SI in the preset N pieces of SI comprises: at least one of existing System Information Blocks (SIBs), or, new SI specific to a coverage-enhanced Machine Type Communication (MTC) terminal.

15. The method according to claim 14, wherein the scheduling period of the first SI is an integral multiple of a duration of a radio frame;

the second to Xth SI has a same or different scheduling periods; and the scheduling period of each of the second to Xth SI is an integral multiple of the scheduling period of the first SI, and is one of K preset scheduling periods, wherein K is a positive integer larger than 1.

16. The method according to claim 14, wherein the second to Xth SI has same or different repeat times; and the repeat times of each of the second to Xth SI is one of M preset repeat times, wherein M is a positive integer larger than 1.

17. A base station, comprising:

a sending module, configured to sequentially send first to Xth System Information (SI) to terminals according to scheduling periods and repeat times of the first to Xth SI in preset N pieces of SI, so that the terminals perform corresponding operations according to the first to Xth SI;

wherein N is a positive integer larger than 1, X is a positive integer larger than 1 and smaller than or equal to N, and the scheduling period and repeat times of the first SI are preset; and the base station further comprises: a notification module, configured to notify the scheduling periods and repeat times of the second to Xth SI to the terminals through fields in the first SI;

wherein any piece of SI in the preset N pieces of SI comprises: at least one of existing System Information Blocks (SIBs), or, new SI specific to a coverage-enhanced Machine Type Communication (MTC) terminal.

18. The base station according to claim 17, wherein the sending module is further configured to, when X is smaller than X, send (X+1)th to Nth SI in the preset N pieces of SI to a terminal through a terminal-specific Radio Resource Control (RRC) message.

19. The base station according to claim 17, wherein the sending module is further configured to send the first to Xth SI to the terminals through a preset logical resource block.

20. The base station according to claim 17, wherein, for nth SI, the operation that the sending module sequentially sends the first to Xth SI to the terminals according to the scheduling periods and repeat times of the first to Xth SI in the preset N pieces of SI comprises that:

the sending module is configured to determine radio frames of the nth SI according to a scheduling period of the nth SI;

a first sub-frame which is for sending the first SI within a range of the radio frames of the nth SI is determined as reference sub-frames of the nth SI;

sub-frames for sending the nth SI are determined according to the repeat times of the first SI as well as reference sub-frames and repeat times of the second to nth SI; and the nth SI is sent through the determined sub-frames, wherein n is a positive integer larger than or equal to 2 and smaller than or equal to X, a set of the radio frames of the nth SI is included in a set of the radio frames of the first SI, and an interval between two adjacent sub-frames in the reference sub-frames of the nth SI is equal to the scheduling period of the nth SI.

21. A terminal, comprising:

a receiving module, configured to sequentially receive from a base station first to Xth System Information (SI) according to scheduling periods and repeat times of the first to Xth SI in preset N pieces of SI, and perform corresponding operations according to the first to Xth SI;

wherein N is a positive integer larger than 1, X is a positive integer larger than 1 and smaller than or equal to N, and the scheduling period and repeat times of the first SI are preset; and the terminal further comprises: a determination module, configured to determine the scheduling periods and repeat times of the second to Xth SI through fields in the first SI sent by the base station;

wherein any piece of SI in the preset N pieces of SI comprises: at least one of existing System Information Blocks (SIBs), or, new SI specific to a coverage-enhanced Machine Type Communication (MTC) terminal.

* * * * *